Nov. 5, 1946.  A. B. CONANT  2,410,569
DUPLEX SOUND RECORDING AND REPRODUCING MACHINE
Filed Jan. 11, 1945  6 Sheets-Sheet 1

INVENTOR.
ALAN B. CONANT
BY
ATTORNEY

Nov. 5, 1946.    A. B. CONANT    2,410,569
DUPLEX SOUND RECORDING AND REPRODUCING MACHINE
Filed Jan. 11, 1945    6 Sheets-Sheet 2

INVENTOR.
ALAN B. CONANT
BY
J. E. Trabucco
ATTORNEY

Nov. 5, 1946.   A. B. CONANT   2,410,569
DUPLEX SOUND RECORDING AND REPRODUCING MACHINE
Filed Jan. 11, 1945   6 Sheets-Sheet 3

INVENTOR.
ALAN B. CONANT
BY
J. E. Trabucco
ATTORNEY

INVENTOR.
ALAN B. CONANT
BY
ATTORNEY.

Nov. 5, 1946.  A. B. CONANT  2,410,569
DUPLEX SOUND RECORDING AND REPRODUCING MACHINE
Filed Jan. 11, 1945   6 Sheets-Sheet 5

INVENTOR.
ALAN B. CONANT
BY
ATTORNEY

Patented Nov. 5, 1946

2,410,569

UNITED STATES PATENT OFFICE 2,410,569

DUPLEX SOUND RECORDING AND REPRODUCING MACHINE

Alan B. Conant, San Francisco, Calif., assignor to Montgomery Brothers, a copartnership Application January 11, 1945, Serial No. 572,274

7 Claims. (Cl. 274—11)

This invention relates to improvements in duplex recording and sound reproducing machines.

An object of my invention is to provide an improved duplex recording and sound reproducing machine comprising two recording and reproducing units which are suitably interconnected to permit intermittent or uninterrupted sound recording, as well as the selective reproduction of any part of the previously recorded sound vibrations.

Another object of my invention is to provide an improved machine of the kind characterized embodying novel means for advancing a plastic recording band or strip at a constant uniform speed under a recording stylus which is arranged to form or swage a sound-groove therein.

A further object of my invention is to provide a sound recording and reproducing machine having novel reproducer adjusting means which enables an operator to accurately position a sound reproducer in operative position with any portion of a previously formed record, either while the recording is continuing or when it has been temporarily discontinued.

Other and further objects of my invention will be pointed out hereinafter, or will be indicated in the appended claims, or will be obvious to one skilled in the art upon an understanding of the present disclosure. For the purpose of this application I have elected to show herein certain forms and details of a recording machine representative of my invention; it is to be understood, however, that the embodiment of my invention herein shown and described is for the purpose of illustration only, and that therefore it is not to be regarded as exhaustive of the variations of the invention.

In the accompanying drawings illustrating a recording machine embodying the preferred principles of my invention—

Fig. 18 is a wiring diagram, illustrating the manner in which the two units may be interconnected.

Referring to the drawings, the numeral 1, 1 designates two similarly shaped supporting enclosures to which is secured a suitably arranged supporting structure 2. My invention includes two recording and reproducing units which are electrically connected one to another by a wired system having suitable controls permitting the timely operation of the units in a manner and for the purposes hereinafter described. The two units are substantially the same, so for the sake of simplicity and brevity, a description of one will suffice for both.

A freely rotatable drum 3 provided with axial bearings 4 is mounted on a non-rotatable shaft 5, one end of which is secured to and is carried by a shiftable cam block 6. The cam block is provided with two parallel projecting members 7 which slidably extend through and are supported in bearings 8 secured to a depending bracket 9 on the supporting structure 2. A spring 10 arranged between the bracket 9 and the cam block 6 urges the said cam block in a direction which normally maintains the drum in operative relationship with a driving roller 11. The driving roller 11 is provided at one end with an enlarged annular area or part 11', and the latter firmly engages with the outer surface of an endless plastic or composition band, belt or strip A constituting the recording media upon which are recorded sound vibrations. The endless recording band A extends over the drum 3, and the driving roller 11, which is made preferably of rubber, engages with the outer surface of the said band and causes the slow rotation of the drum and the feeding of the said recording media past a groove forming stylus. The enlarged area 11' of the driving roller 11 firmly engages with the band and presses it against the drum to cause the rotation of the drum and the advancement of the said band, while the remaining portion of said driving roller, less firmly engaging with the said band, prevents the buckling of the latter. The smooth advancement of the band A is made possible by having only a portion of the annular surface of the driving roller firmly engaging with the said band.

Figure 17:
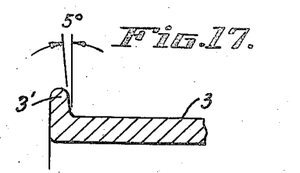
Fig. 17 is a detail section showing the preferred shape of an annular rim on the drum.

The drum is provided at opposite ends with annular rims 3' which have beveled surfaces at their inner opposed sides, the said surfaces being disposed at angles of about five degrees from the vertical (see Fig. 17), and inclined in opposite directions. The inclined surfaces of the drum's rims being so arranged causes the band A to center itself on the drum, thereby preventing the lateral displacement thereof during the recording operation. The surface of the drum engaged by the recording band is substantially the same width as the latter, and the inclined surfaces of the rims 3' are arranged to engage with the outer edges of the band and prevent the lateral shifting thereof with respect to the drum.

Figure 9:
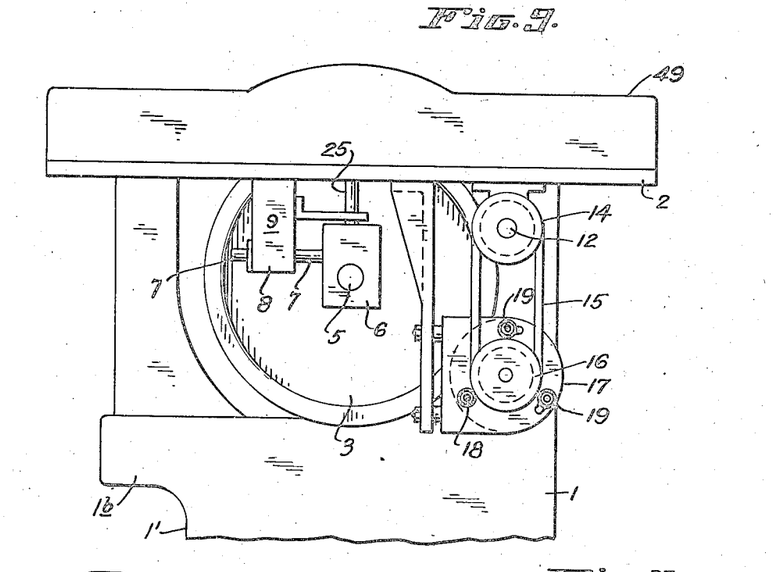
Fig. 9 is a rear view of a part of the machine, showing the drive means for one of the units.
Figure 10:
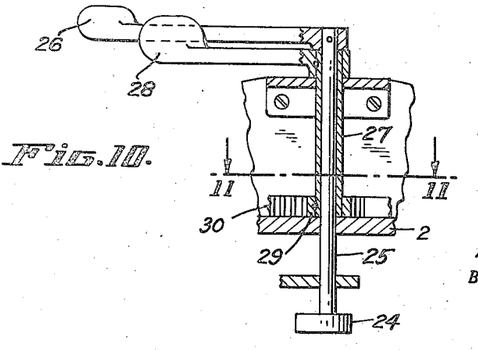
Fig. 10 is an enlarged sectional view taken on the line 10—10 of Fig. 2.
Figure 11:
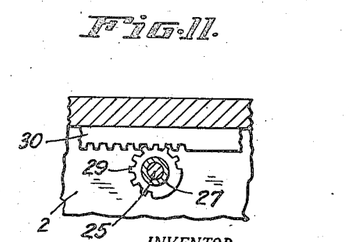
Fig. 11 is a sectional view taken on the line 11—11 of Fig. 10.

The roller 11 is secured on an axial shaft 12 supported in bearings 13 suspended from the supporting structure 2. A pulley 14 on an end of the shaft 12 is connected by an endless belt 15 to a pulley 16 secured to the shaft of an electric motor 17 which is suspended on the supporting structure 2. The tension of the belt 15 is preferably adjusted by pivotally moving the motor about a pivot 18 (see Fig. 9) to a suitable position and then securing the said motor in its adjusted position by means of clamping nuts 19.

The roller 11 is partially encircled by a curved guard 20 which is arranged to prevent the endless recording band A from fouling the said roller or adhering thereto.

The recording band A passes between two opposed wipers 21 and is thereby freed of any lint, dust or other foreign particles before advancing onto the drum 3. The wipers 21 are detachably supported on brackets 22, and either or both may be removed for cleaning purposes. The wipers 21 produce a suitable drag on the recording band to cause it to firmly engage with the drum where it passes under the recorder and reproducer heads. A suitable guard 23 positioned beneath the drum 3 and in close proximity thereto is adapted to cause the detachment of the band A from the drum at this point in the event static electricity should tend to cause an attraction of the band with respect to the drum.

The endless belt A being flexible and having a substantial length, assumes a constantly changing position inside the enclosure 1. Because of the presence of static electricity there is sometimes a tendency for the belt to become entangled or otherwise arranged in a manner whereby there is an abnormal resistance offered to its smooth and uniform travel over the drum. To obviate such an undesirable phenomenon, the front side of the enclosure 1, beneath the point on the drum where the belt first contacts therewith, is bent inwardly as at 1' to provide upper and lower chambers 1a and 1b. The chambers 1a and 1b, particularly the former, provides recesses in the front side of the enclosure within which a portion or portions of the endless belt may enter and become disengaged from other portions before being drawn upwardly onto the drum. The provision of a surface 1' between the chambers 1a and 1b with which the upwardly moving portion of the endless belt engages, cooperated with the said chambers to insure an uninterrupted smooth feeding of the belt past a recording or groove-forming stylus.

Figure 7:
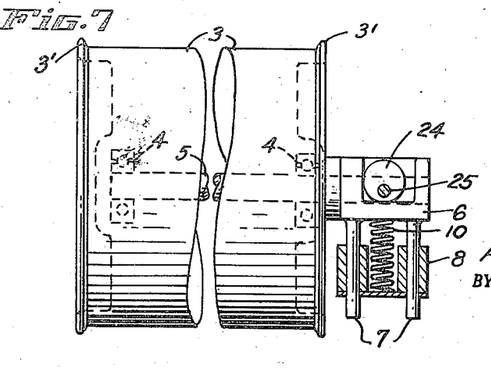
Fig. 7 is a sectional view taken on the line 7—7 of Fig. 5.

The adjustment of the drum from an operative position with respect to the driving roller 11 for the purpose of permitting the removal of the band A and the substitution of another in its place, is accomplished by the following mechanism: Engaging with the cam block 6 is a cam 24 which is eccentrically secured to a substantially vertical shaft 25, the upper end of which is provided with a handle 26. The turning of the shaft 25 through an angle of about one hundred and eighty degrees in a clockwise direction (Fig. 7) will cause the cam member 24 to move the cam block 6 against the pressure of the spring 10 to a position whereby the drum 3 no longer is in operative relation with respect to the driving roller 11. When in such a position the band may be removed by slipping it from the free end of the drum, after which the said band can be removed from the enclosure 1 through an opening in the front thereof. After again placing another band on the drum, the latter may be shifted into an operative position with respect to the driving roller 11 by reversing the movement of the handle 26.

Figure 1:
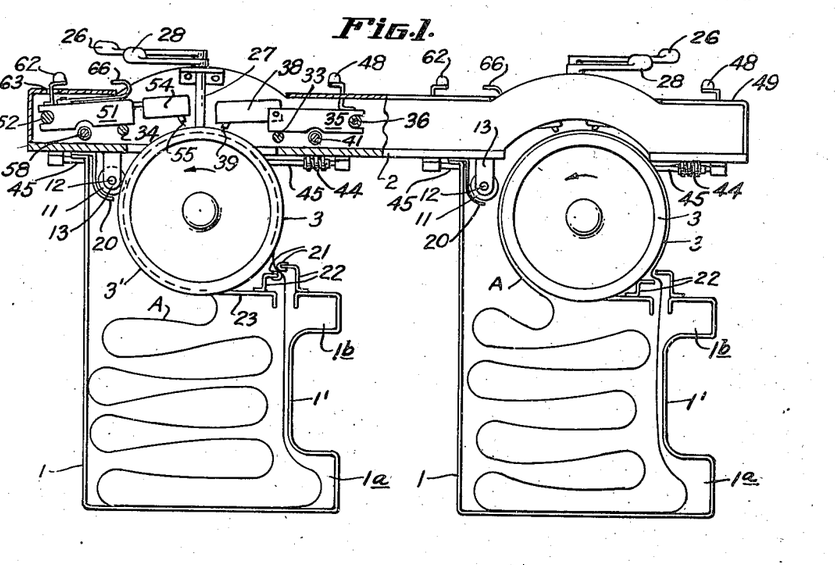
Fig. 1 is a sectional view taken on the line 1—1 of Fig. 2.
Figure 2:
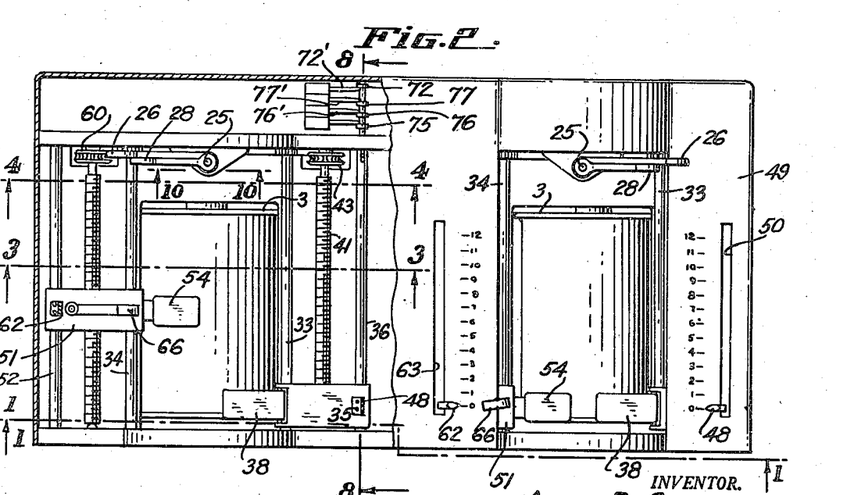
Fig. 2 is a plan view of the machine, showing parts broken away and other parts in section.
Figure 3:
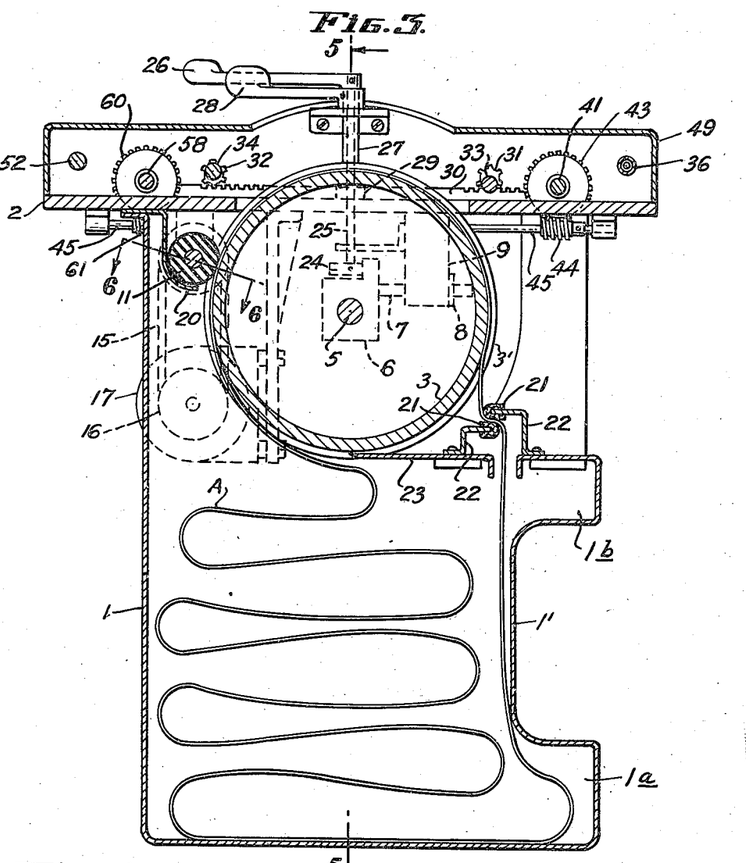
Fig. 3 is an enlarged sectional view taken on the line 3—3 of Fig. 2.
Figure 4:
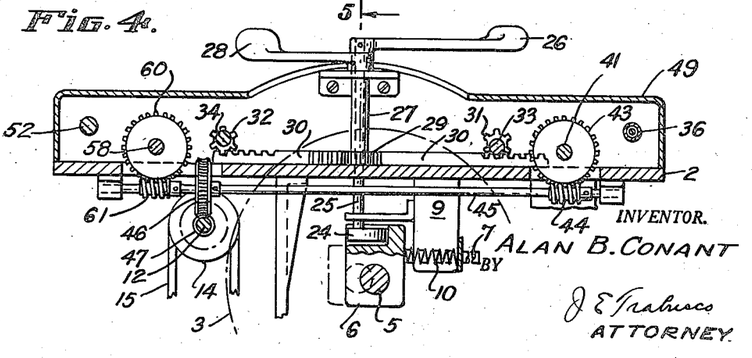
Fig. 4 is a sectional view taken on the line 4—4 of Fig. 2.
Figure 5:
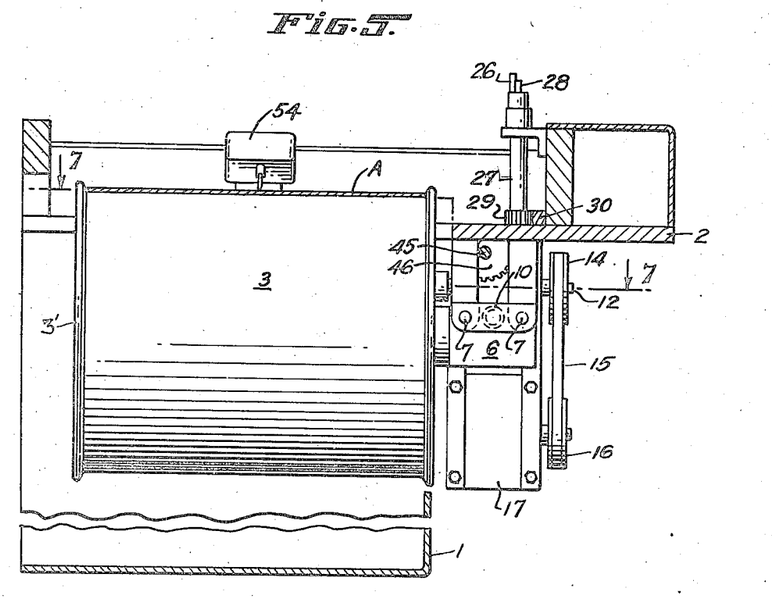
Fig. 5 is a sectional view taken on the line 5—5 of Fig. 3.
Figure 6:
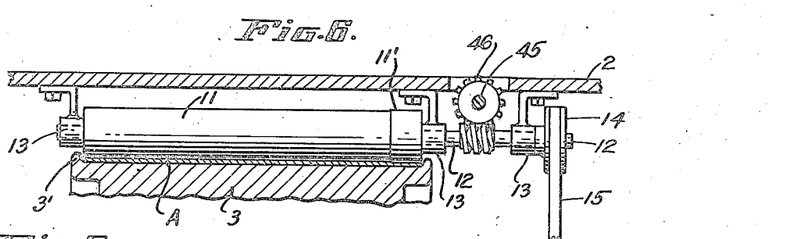
Fig. 6 is a sectional view taken on the line 6—6 of Fig. 3.
Figures 14, 15, 16:
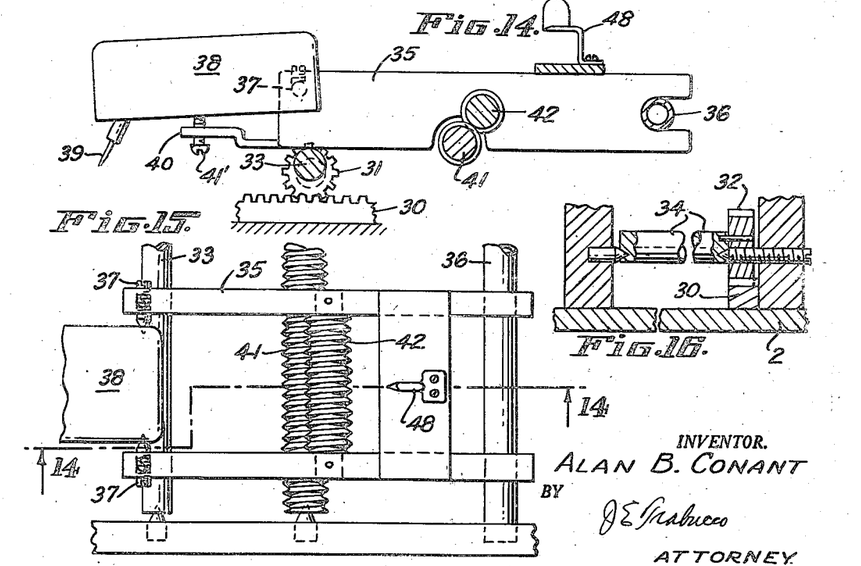
Fig. 14 is a sectional view taken on the line 14—14 of Fig. 15.
Fig. 15 is a plan view, partly in section, of that part of the machine shown in Fig. 12.
Fig. 16 is a detail section showing the means for elevating a recording head.

The shaft 25 rotatably extends through a sleeve 27 having a handle 28 secured to its upper end and a semi-circular gear 29 to its lower end. The semi-circular gear 29 engages with a rack 30 which is arranged for forward and rearward reciprocatory movement. The rack at its opposite ends is provided on its upper side with teeth with which circular gears 31 and 32 engage. The circular gears are secured, respectively, to transverse cam rods 33 and 34, each of which is eccentrically mounted at its opposite ends, the said cam rods being raised and lowered as the rack 30 is reciprocated (see Fig. 16). The said cam rods are so arranged with respect to each other that one is raised while the other is lowered. The raising and lowering of the cam rods takes place simultaneously with the movement of the rack 30. Resting on the cam rod 33 is a carrier member 35 which is pivotally and slidably supported at its forward end by a transverse tubular guide 36 (see Figs. 14 and 15). Pivotally supported as by tapered screws 37 adjustably arranged at the rear end of the carrier member 35, is a recorder head 38 having a groove-forming stylus 39 and other well known electrical recording means (not shown) secured therein. With the recorder head 38 being pivoted at its forward end, the stylus 39 normally contacts the outer surface of the recording band A moving at a constant speed, with sufficient pressure to press or swage a sound-groove therein. The recorder head is electrically connected in the usual manner to suitable sound collecting means. Adjustable means comprising a bar 40 secured to the carrier member 35 and an adjustable screw 41' on the bar, provide a stop for preventing the recorder head from dropping downwardly beyond a certain position, thereby avoiding possible damage by the stylus to the recording band or the sound-grooves thereon, and also providing a support permitting the stylus to be lifted from the band when the carrier member is raised. The turning of the handle 28 will cause the cam rod 33 to raise the rear end of the carrier member 35 sufficiently to lift the stylus 39 from engagement with the recording band. A rotatable threaded shaft 41 extending transversely in parallel relation to the tubular guide 36 is engaged by a non-rotatable threaded rod 42 which is secured to the carrier member 35. The rotation of the threaded shaft 41 in a suitable direction will cause the carrier member 35, the recorder head 38 and the stylus 39 to be slowly moved from left to right in a direction paralleling the axis of the drum 3. Thus as the endless recording band A is moved with constant speed beneath and in engagement with the stylus 39, the said stylus is slowly moved from left to right to form a continuous sound-groove across the band. The threaded shaft 41 is secured to a circular end gear 43 which engages with a worm gear 44 on a shaft 45, the said shaft carrying a gear 46 that engages with a worm gear 47 secured to the shaft 12 (see Figs. 4 and 6). Secured to the carrier member 35 is an indicating finger piece 48 (see Figs. 14 and 15) which permits the manual movement of the said carrier member and the recording head 38 to the left after the recording operation has been completed and another record is about to be commenced on a substituted recording band. The finger piece 48 projects above a cover plate 49 through a slot 50 therein, and through the provision of a graduated scale or other indicia, the said finger piece may be used to indicate the position of the stylus 39 with respect to the lateral edges of the recording band. The recording and reproducing units are positioned beneath the cover plate 49 and are suitably protected thereby.

Figure 12:
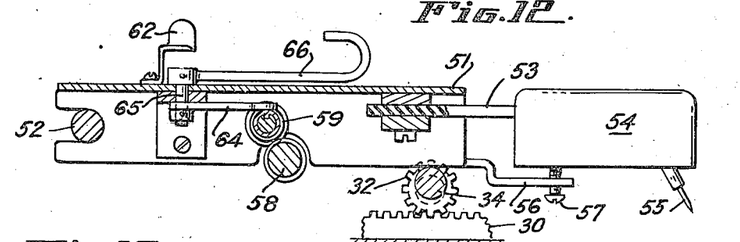
Fig. 12 is a sectional view taken about on the line 12—12 of Fig. 13.
Figure 13:
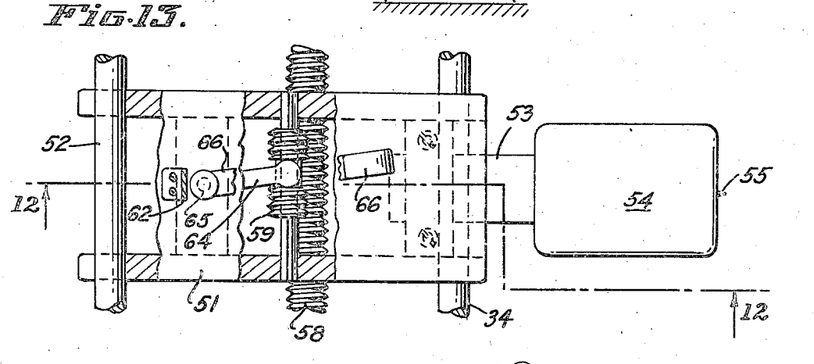
Fig. 13 is a plan view, partly in section, of that part of the machine shown in Fig. 12.

Resting on the cam rod 34 is a carrier member 51 which is pivotally and slidably supported at its rear end by a transverse guide bar 52 (see Figs. 12 and 13). Flexibly connected to the forward end of the carrier member 51, as by a rubber strip 53, is a reproducer head 54 having a sound reproducing stylus 55 and other well known electrical sound reproducing means (not shown) carried therein. With the reproducer head being arranged for up and down movement, the stylus 55 normally engages with a record groove in the recording band A. The reproducer head is electrically connected in the usual manner to suitable sound reproducing means. Adjustable means comprising a bar 56 secured to the carrier member 51 and an adjustable screw 57 on the bar, provide a stop for preventing the reproducer head from dropping downwardly beyond a certain position, thereby avoiding possible damage by the stylus 55 to the recording band or the sound-grooves thereon, and also providing a support permitting the stylus to be lifted from the band when the carrier member 51 is pivotally raised. The carrier member 35 and the recording head 38 are in raised positions when the carrier member 51 and the reproducer head 54 are in lowered positions, and vice versa. Thus when the reproducer head is positioned with its stylus engaging with a record groove on the recording band, the recording head may be in a raised position with its stylus disengaged from the said band, or the said recording head may be maintained in its recording position while previously recorded sound vibrations are being reproduced by the reproducer head 54. The manipulation of the handle 28 moves the rack 30 to change the relative positions of the reproducer and recording heads. A rotatable threaded shaft 58 extending transversely in parallel relation to the guide bar 52 is engaged by a non-rotatable but laterally adjustable threaded rod 59 which is secured to the carrier member 51. The rotation of the threaded shaft 58 in a suitable direction will cause the carrier member 51, the reproducer head 54, and the stylus 55 to be slowly moved from left to right in a direction paralleling the axis of the drum 3. Thus, as the endless recording band A is moved with constant speed beneath and in engagement with the stylus 55, the said stylus is moved slowly from left to right to reproduce the sound vibrations recorded on the said band. The threaded shaft 58 is secured to a circular end gear 60 which engages with a worm gear 61 on the shaft 45. Secured to the carrier member 51 is an indicating finger piece 62 (see Figs. 12 and 13) which permits the manual movement of the said carrier member and the recording head 54 to the left or right. The finger piece 62 projects above the cover plate 49 through a slot 63 therein, and through the provision of a graduated scale or other indicia, the said finger piece may be used to indicate the position of the stylus 55 with respect to the lateral edges of the recording band. Through the finger piece 62 the reproducer head 54 may be adjusted laterally to cause its stylus 55 to engage with any particular groove across the record band from which sound vibrations are to be reproduced. In order to provide means for the fine lateral adjustment of the reproducer head so that the stylus 55 may be positioned directly in a sound-groove rather than on an area between grooves, I have pivotally attached one end of an adjusting bar 64 to the carrier member 51 as at 65, and pivotally connected its opposite rounded end to the non-rotatable threaded rod 59. A handle 66 secured to the pivot 65 and arranged above the carrier member 51 in substantially parallel relation to the adjusting bar 64 serves to turn the adjusting bar about its rounded end as a pivot and thereby adjust the carrier member and the reproducer head 54 laterally. By suitably adjusting the lateral position of the reproducer head 54, the stylus 55 may be brought into exact engagement with a sound-groove in the band A.

In order that there may be a continuous and uninterrupted recording of sound, even when one recording band A is being removed, or its recording surfaces are being reversed, or when one band is being substituted for another, there is provided two identical recording and reproducing units such as the one above described. Suitable electrical means connecting the two units automatically commences the operation of one unit just prior to the time the other unit ceases operating. Provision is made for both units to record the same sound vibrations near the termination of one unit's recording and at the commencement of the other. The overlapping or duplex recording is desirable since by such a procedure a continuous and uninterrupted recording is insured. There may also be effected by manually operated control means an intermittent recording of sound. If at any time it is desired that the sound vibrations previously recorded on a previously recorded band be reproduced, the handle 28 is suitably manipulated to bring the stylus of the reproducer head 54 into engagement with the band. When the reproducer head 54 is moved downwardly, the recorder head 38 is elevated sufficiently to disengage its stylus 39 from the recording band.

Figure 8:
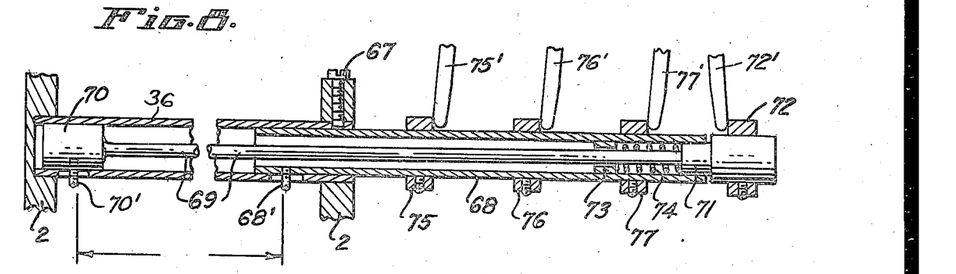
Fig. 8 is a sectional view taken on the line 8—8 of Fig. 2.

In order that the circuit supplying electrical energy to the recording and reproducing unit which is next to be operated may be automatically closed at a time when the then operating unit is completing its recording operation, there is provided suitable means for accomplishing this result (see Fig. 8). The tubular guide 36 is secured against lateral movement as by a set screw 67. Slidably mounted in the tubular guide 36 is a tubular member 68. Extending through the aligned tubular guide 36 and the tubular member 68 is an adjustable rod 69 having enlargements 70 and 71 secured to its opposite ends. The enlargement 70 is positioned near the left end of the guide 36 and it has a projecting member 70' extending through a slot in the guide. The tubular member 68 is provided with a projection 68' which extends through a similar slot located in the opposite ends of the said tubular guide 36. The enlargement 71 carries an adjustable cam member 72. Arranged in the tubular member 68 between an abutment 73 and the enlargement 71 is a spiral spring 74 which tends to exert a pressure upon the said enlargement to the right. The cam member 72 is arranged to actuate a switch arm 72' when the enlargement 71 moves to the left. Carried by the tubular member 68 are adjustable cams 75, 76 and 77 which are respectively associated with switch arms 75', 76' and 77'. The movement of the tubular member 68 to the right by the engagement of the recorder head carrier 35 with the projection 68' of said member causes the cam members 75, 76 and 77 to be carried to positions where they actuate the switch arms 75', 76' and 77' to close their associated switches. When the recording head carrier 35 is manually moved to the left after completing the recording operation, the projecting member 70' is engaged thereby and moved in the same direction against the pressure of the spring 74 to cause the cam member 72 to actuate the switch arm 72' to close its associated switch.

On the wiring diagram illustrated in Fig. 18 the two recording and reproducing units and their parts are distinguished from one another by broken line enclosures referred to and designated as unit 1 and unit 2.

The switches of which switch arms 72', 75', 76' and 77' are a part are designated on the wiring diagram by the same reference numerals. The switches 75' and 76' when closed by cams 75 and 76 start one motor and stop the other, energizing mechanically held in interlocking relays. When the carrier 35 engages with 68', the cam 75 engages arm 75' to close its associated switch, thereupon energizing a relay coil and starting the motor of the then inoperative unit. After the carrier 35 proceeds as far to the right as permitted by the compression spring 74 the cam 76 closes the switch of switch arm 76', thereupon energizing a relay coil which opens the motor circuit of the then operating unit, thereby stopping the latter's operation.

The switches 72' and 77' (not shown on the wiring diagram) are connected in light circuits, the former causing a light to be energized which indicates a unit is ready for operation, and the latter causing a light to be energized which indicates a unit has completed its recording operation.

Electrical energy is initially supplied to a terminal block 78 through a power line having a single-pole switch and a fuse in line. Electrical energy is distributed to a power supply unit, to a recording amplifier and to a reproducing amplifier as well as to the various switches, relays and motors. The relays employed are of the mechanical interlocking type having two sections or coils $a$ and $b$.

Commencing a recording operation, relay R1 of unit 1 is manually placed in an operating position by closing the contacts of the section $a$, while the contacts of the section $b$ in relay R2 of unit 2 are opened. During intermittent or continuous operation these relays remain in this position until the recording operation is completed on the unit 1. Electrical energy is transferred to the relay R2 of unit 2 by the recording head carrier 35 engaging with the projection 68' and moving the tubular member 68 so the cam 75 actuates the switch arm 75' to close its switch. During recording it is possible to reproduce any previously recorded sound by use of the manual switch 79, which upon being closed will energize the motor of unit 1 in the event the relay contacts to this motor are not closed.

Assume the recorder to be properly connected to a source of power, with the signal line leading into the recording amplifier connected to a signal source such as a telephone, radio or oscillator. When the manual switch 80 is closed, the motor of unit 1 will be energized and cause the advancing of the recording band A under the recorder head 38. The stylus 39 carried by the recorder head will swage or form a sound groove in the recording band as the latter is advanced over the drum 3. The relays R1 and R2 each have two contacts, one for its associated motor and the other for its associated recording head.

As recording proceeds, the recording head 38 moves transversely across the recording band A. When the recording operation is near completion 38 engages with the projection 68', and as heretofore explained, closes the swtich 75, thereupon energizing the coil $b$ of relay R2, which automatically starts the motor of unit 2 to commence the recording by that unit. The recording on unit 1 proceeds for a short interval after the recording on unit 2 has commenced, thus permitting short duplicate recordings to be made at the commencement of the record on the band of unit 2 and at the termination of the record on the band of unit 1. After the recording has proceeded for a short time on unit 1 and its carrier 35 has progressively moved to the right, the cam 76 is moved to close the switch 76', thereupon energizing the section or coil $a$ of relay R1, which in turn causes the mechanically held-in armature of coil $b$ to drop out. This opens the circuit to the motor of unit 1 and discontinues the operation of the latter. This sequence is followed in the operation of unit 2 and the transfer of energy back to unit 1.

During recording on either unit the reproducer head 54 of the then recording unit may be lowered to cause its reproducing stylus to engage with the grooved record surface of the band A. Any part of the recorded sound may thereupon be transmitted through a suitable reproducer to the reproducing amplifier, and then to the loud speaker.

Having described my invention, what I claim is:

1. In a sound recording and reproducing machine, a rotatable drum over which a record strip is advanced during a recording operation, a driving roller positioned in operative relation with the drum, the said driving roller and the drum being arranged for engagement with opposite sides of the record strip to advance the strip over the drum, means for shifting the drum to move it from an operative position with respect to the driving roller, whereby the advancing of the record strip over the drum may be discontinued, and means arranged above the drum for engaging with the record strip to form a sound-groove therein when the strip is advanced over the drum.

2. In a sound recording machine, a rotatable drum arranged to movably support a record strip while the strip is advanced beneath a sound-groove forming stylus, and a rotatable elongated driving roller arranged to engage with the strip and press it against the drum to effect the advancement thereof over the drum, the said roller having an enlarged part at one end of greater diameter than the diameter of the other part of the roller, whereby the enlarged part of the roller may contact the strip with greater pressure than its other part.

3. In a sound recording machine, a rotatable drum arranged to movably support a record strip while the strip is advanced over the drum and beneath a sound-groove forming stylus, a rotatable driving roller frictionally engaging with the strip and arranged with the drum to advance the strip over the drum, and opposed wipers engaging with opposite sides of the strip and arranged to provide a resistance to the advancement of the strip over the drum, whereby the strip will be made to firmly engage with the drum at points beneath the stylus.

4. In a sound recording machine, a rotatable drum arranged to movably support a record strip while the strip is advanced over the drum and beneath a sound-groove forming stylus, a rotatable driving roller frictionally engaging with the strip and normally arranged with the drum to advance the strip over the drum, means for shifting the drum to an inoperative position whereby the strip does not engage with the driving roller, and opposed wipers engaging with opposite sides of the strip and arranged to provide a resistance to the advancement of the strip over the drum, whereby the strip will be made to firmly engage with the drum at points beneath the stylus.

5. In a sound recording and reproducing machine, a rotatable drum over which a record strip is advanced during a recording operation, a rotatable driving roller operatively arranged with respect to the drum and the strip for advancing the strip over the drum, a sound recorder head mounted above the drum and carrying a groove forming stylus for engagement with the record strip, means for moving the recorder head transversely with respect to the strip, a sound reproducer head mounted above the drum and carrying a groove-engaging sound reproducing stylus, means for moving the reproducer head transversely with respect to the strip, and common means for changing the relative positions of the recorder head and the reproducer head, whereby the groove-forming stylus and the sound reproducing stylus may be alternately positioned in engagement with the strip or they may both be positioned in or out of engagement therewith.

6. In a sound recording and reproducing machine, an enclosure having a depth sufficient to hold a considerable part of an endless record belt, a rotatable drum mounted above the enclosure over which the endless belt movably extends, a driving roller arranged in operative relation to the drum and the belt for advancing the belt over the drum, the said enclosure having one of its sides extending outwardly to provide spaced recesses for receiving parts of the endless belt as it changes position in the enclosure while passing onto and from the drum.

7. In a sound recording and reproducing machine, an enclosure having front, rear and side walls and a depth sufficient to hold a considerable part of an endless record belt, a rotatable drum mounted above the enclosure over which the endless belt movably extends, a driving roller arranged at the rear of the drum and in operative relation with the drum and the belt, and a spaced recess arranged in the front wall of the enclosure for receiving a part of the endless belt as it changes position in the enclosure while passing onto and from the drum.

ALAN B. CONANT.